UNITED STATES PATENT OFFICE.

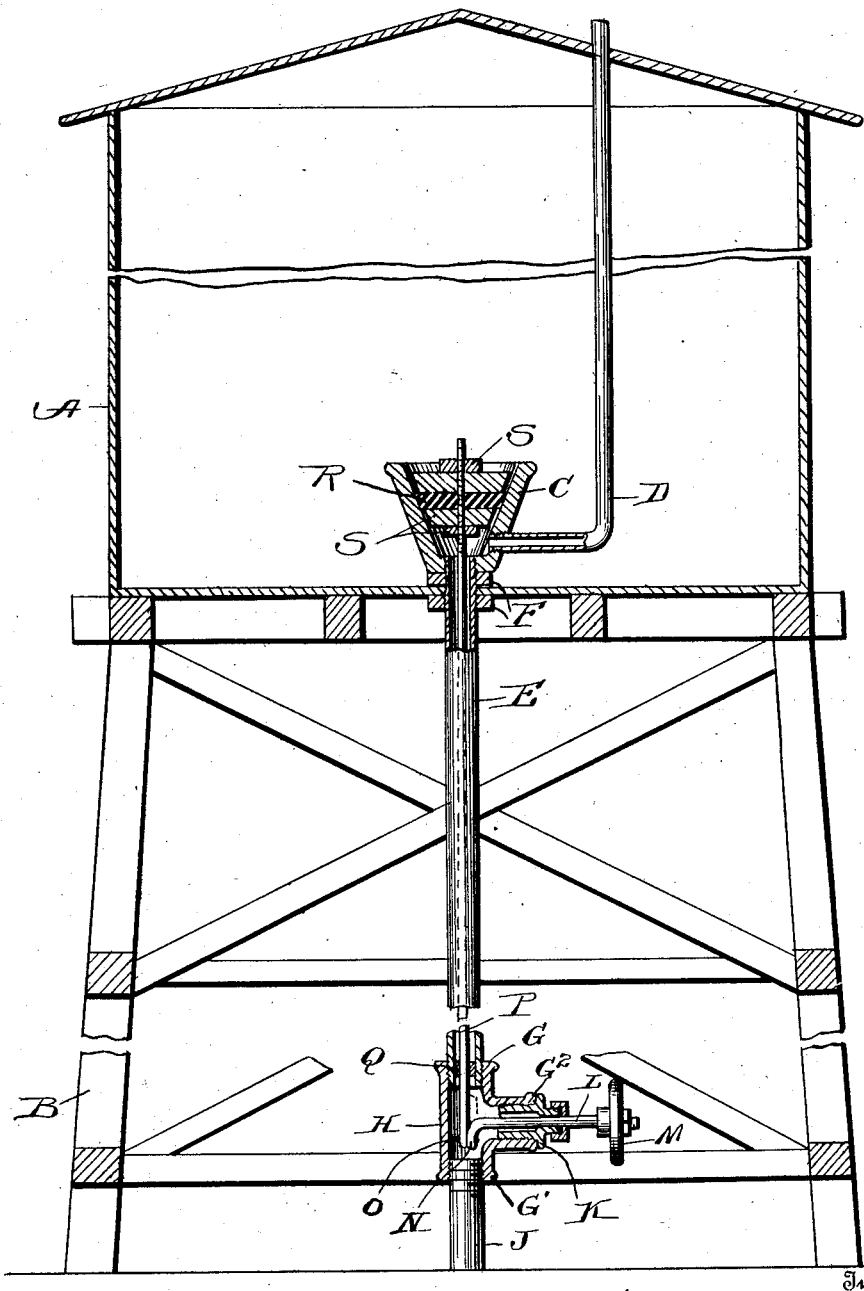

WILIAM THOMAS WOOD, OF HEREFORD, TEXAS.

CUT-OFF.

1,021,566.  Specification of Letters Patent. Patented Mar. 26, 1912.

Application filed March 6, 1911. Serial No. 612,697.

*To all whom it may concern:*

Be it known that I, WILIAM THOMAS WOOD, a citizen of the United States, residing at Hereford, in the county of Deaf Smith and State of Texas, have invented certain new and useful Improvements in Cut-Offs, of which the following is a specification.

My invention relates to improvements in cut-offs and has special reference to a cut-off for use in connection with water supply tanks to shut off the supply of water and prevent freezing in the pipes.

The object of my invention is the provision of a cut-off which can be operated with ease, and which will be thoroughly efficient for the purpose designed.

To attain the desired object my invention consists of a cut-off mechanism embodying novel features of construction and arrangement of parts substantially as disclosed herein.

The single figure of the drawing is a vertical sectional view of a tank and framework and my novel cut-off mechanism, the mechanism being shown in the position the parts occupy when the valve is closed and the water supply cut off.

In the drawings: the letter A designates a tank for supplying the water and B designates a frame or supporting structure for maintaining the tank above ground, the tank and frame being of any size and construction.

In the bottom of the tank is mounted the conical or flaring valve casing C, to one side near the lower portion of which leads the air pipe D, which extends upward to the air, and to the lower end of the valve casing is connected the upper end of the threaded pipe E, which pipe is retained in place by means of the locking nuts F. The said pipe E has its lower end engaging the upper vertical threaded nipple G of the coupling H, whose lower threaded nipple G' is engaged by the upper threaded end of the supply pipe J, which supplies the water from the tank. The horizontal nipple G² of the coupling receives a cap K in which is mounted the shaft L, having a handle M on its outer end and a crank N on its inner end, said crank engaging the lower end O of the valve rod P. The valve rod extends upward through guides Q, in the valve casing and carries the rubber or elastic valve R, which valve is adjustable on the stem by means of the nuts S, which also serve to regulate the movement of the rod, take up wear on the valve and keep the parts in proper position.

In operation it will be noted that the valve is lifted from its seat in the valve casing and the water flows freely from the tank to the supply pipe and to cut off the supply of water and prevent freezing in the pipe it is simply necessary to move the valve stem and close the valve on its seat and the supply is instantly cut off.

My mechanism is of such simple construction that it will prove entirely reliable and durable: it cannot get out of order and will stand hard usage and by reason of its adjustments can be easily adapted to any tank and supply pipe of ordinary construction and arrangement.

I claim:

1. In a device of the character described, in combination, a tank, a supporting structure therefor, a conical valve casing mounted vertically in the bottom of the tank centrally thereof, an air pipe opening into the casing, a vertical hollow pipe connected at its upper end to the lower end of the valve casing, a three-way coupling disposed near the ground and having an upper threaded nipple engaging the lower end of the hollow pipe, a supply pipe connected to the lower threaded nipple of the three-way coupling, a horizontally extending threaded nipple formed upon the three-way coupling intermediate the vertical length thereof, a cap mounted in said horizontal nipple, a cranked shaft passing transversely through said horizontal nipple, a valve rod mounted in the vertical hollow pipe, said rod extending upwardly into the valve casing, an adjustable valve carried by said rod, the lower end of said rod engaging the cranked end of the transverse shaft, and means for rotating said shaft.

2. In a device of the character described, in combination, a tank, a supporting structure therefor, a conical valve casing mounted in the tank, an air pipe opening into the casing, a vertical hollow pipe connected at its upper end to the lower end of the valve casing, a three-way coupling disposed near the ground and having an upper threaded nipple engaging the lower end of the hollow pipe, a supply pipe connected to the lower threaded nipple of the three-way coupling, a horizontally extending threaded nipple formed upon the three-way coupling intermediate the upper and lower nipples, a cranked shaft passing transversely through said horizontal nipple, a valve rod mounted in the vertical hollow pipe, said rod extending upwardly into the valve casing, an elastic valve carried by said rod, the lower end of said rod engaging the cranked end of the transverse shaft, means for rotating said shaft, and means for adjusting said valve, said means consisting of a pair of nuts mounted in the valve casing above and below the valve and engaging therewith.

In testimony whereof I affix my signature, in presence of two witnesses.

WILIAM THOMAS WOOD.

Witnesses:
L. A. SHOUD,
FRED BAIRD.

Copies of this patent may be obtained for five cents each, by addressing the "Commissioner of Patents, Washington, D. C."